March 3, 1942.                A. A. SCHWARTZ                2,275,036
                                DEPTH GAUGE
                              Filed Nov. 9, 1940
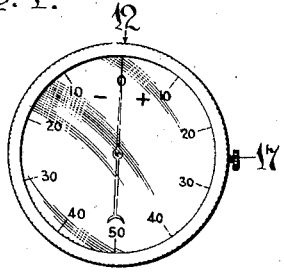
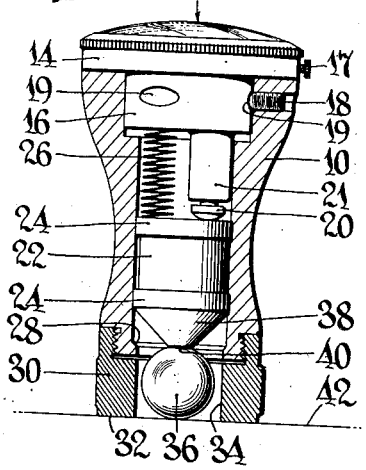
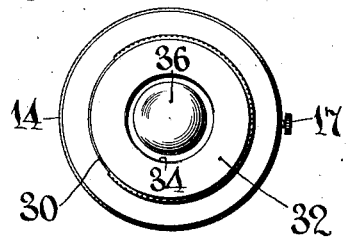
INVENTOR
Arthur A. Schwartz
BY
Beau, Brooks, Buckley & Beau.
ATTORNEYS Patented Mar. 3, 1942

2,275,036

UNITED STATES PATENT OFFICE 2,275,036

DEPTH GAUGE

Arthur A. Schwartz, Buffalo, N. Y., assignor to Bell Aircraft Corporation, Buffalo, N. Y.

Application November 9, 1940, Serial No. 365,085

4 Claims. (Cl. 33—172)

This invention relates to depth gauges for drilled countersinks and blind holes and the like. One of the objects of the invention is to provide an improved gauge of the character described which is of simplified structural form and capable of an improved type of operation whereby the gauge is adapted to provide more accurate readings in connection with increased speed of use and application to multiple recess measurement operations. Consequently, the gauge of the invention is adapted to provide marked advantages in connection with relatively large scale multiple drilling operations, and to make possible rapid and accurate inspections of multiple drillings in work pieces entering, for example, into the fabrication of modern metallic structures such as airplanes, or the like. Other objects and advantages of the invention will appear in the specification hereinafter, and it is to be understood that, as used herein, the term countersink is intended to mean any conical shaped opening or recess in a work piece. More specifically, the present invention relates to subject matter similar to that of my prior Patent 2,212,306, and constitutes an improvement thereover.

In the drawing:

Fig. 1 is a top plan of a gauge of the invention;

Fig. 2 is a view partly in vertical section and partly in side elevation thereof; and Fig. 3 is a bottom plan thereof.

The exemplification of the invention illustrated by the drawing comprises a generally tubular shaped body member 10 upon the upper end of which is mounted an indicating mechanism designated generally by the numeral 12. The indicator mechanism includes a calibrated dial and a rotatable pointer and the pointer actuating mechanism, all of which are mounted upon and within a housing 14 having a reduced portion 16 extending into the bore of the tubular member 10 into close fitting relation therein. A dial set screw 17 is provided to lock the dial in adjusted positions upon the housing 14; the dial being rotatable relative to the housing 14 about the longitudinal axis of the gauge to permit the dial to be set in advance of use of the gauge so as to register in predetermined manner with the pointer whenever the work piece contacting element of the gauge moves into engagement with a properly dimensioned countersink or blind hole, as will be explained hereinafter. Set screws 18 are threaded through apertured portions of the tubular member 10 and into seated relation against flattened portions 19 of the housing 16 for detachably locking the housing upon the tubular member. The indicator actuating mechanism includes a stem 20 extending downwardly within the interior of the tubular body 10 for reciprocation within an extending housing portion 21 to transmit motion from the work piece contacting element of the gauge to the motion transmitting and multiplying mechanism of the indicator device 12.

A slide member 22 of generally cylindrical form is mounted with the bore of the tubular member 10 in free sliding relation therein, and in order to minimize friction between the tubular member 10 and the slide member 22 the latter is reduced intermediately of its ends so as to provide opposed bearing portions 24 disposed in sliding contact with the tubular member. A compression spring 26 is mounted within the tubular member above the plunger 22 in such manner as to bear at one of its ends against the fixed housing portion 16 and at its opposite end against the plunger 22 in such manner as to resiliently urge the plunger away from the indicator actuating stem 20. The tubular member 10 is provided with an inner shoulder 28 adjacent its lower end for limiting movement of the plunger 22 under the action of the spring 26 so as to prevent the plunger from moving out of assembled relation with respect to the tubular member.

A detachable collar 30 is screwthreaded into engagement with the lower end of the tubular member 10 and is provided with a lower work piece contacting face portion 32 of accurate plane form. The bore 34 of the collar 30 is of such diameter that a work piece contacting ball 36 may be disposed therewithin in such manner as to be freely movable in all directions relative to the collar 30. In other words, the diameter of the bore 34 is substantially greater than the diameter of the ball 36, and therefore the ball is free to move both longitudinally and laterally of the gauge from the position illustrated in the drawing. The lower end of the plunger 22 is frusto-conically shaped as at 38, and terminates in an accurately plane surface 40 disposed normal to the longitudinal axis of the plunger and adapted to bear in abutting relation against the upper portion of the ball 36.

The operating elements of the gauge are so dimensioned and arranged that the device is adapted to be placed upon the surface of a work piece as indicated at 42 (Fig. 2) so as to rest thereon in upright position under the influence of the forces of gravity, and to be slid across the surface of the work piece until the ball 36 comes into registry with a countersink or blind hole extending into the work piece. The freedom of movement provided for the ball 36 within the collar 30 allows the ball to seat itself without interference from other parts of the gauge within the lowermost portion of the recess in the work piece, and thus to provide an accurate measurement of the depth thereof from the outer surface of the work piece. The annular body member 10 and the collar 30 are formed of some non-magnetic material such as copper, aluminum, nickel, or some plastic material, or the like. The slide member 22 is formed of a material that is capable of retaining a charge of permanent magnetism for a relatively long time, and for this purpose I have found that chrome molybdenum steel is suitable.

The ball 36 is formed of some suitable magnetically attractive metal such as steel; and the slide member 22 is permanently magnetized prior to assembly of the device to such degree that the steel ball 36 will be held by the magnetic charge of the slide member 22 to the latter. Hence, after assembly of the device, it may be moved about by the user as in the manner of any other self contained tool; the magnetism of the slide member being sufficient to prevent the ball 36 from becoming accidentally disassembled from the device. However, the magnetic forces possess no substantial components in directions radially of the longitudinal axis of the gauge, and therefore the ball 36 is free to roll laterally against the plane surface 40 of the slide member 22 as may be required to permit the ball to move directly into the lowermost portion of the recess to be measured as explained hereinabove. Thus, an improved means for maintaining the work piece contacting ball in operative position with respect to the motion transmitting elements of the indicator mechanism is provided.

To adapt the gauge of the invention to measurement of various sized recesses, a series of balls resembling the ball 36 but being of different diameters are provided for selective use in connection with the gauge device. Also, a series of collar members resembling the collar member 30 of the drawing but differing therefrom in their vertical dimensions and in the diameters of the bores thereof is provided for use in conjunction with the corresponding work piece contacting balls. The vertical dimensions of the various collar members are preferably so relatively proportioned as to compensate for the corresponding differences in diameters of their associated ball members so that upon substitution of any collar-ball unit for a previously used collar-ball unit no adjustment of the dial indicator mechanism will be required in order to provide that the indicator pointer shall move to a common point upon the calibrated dial, provided the recess in each case being measured is of proper depth. Hence, the calibrated dial of the indicator mechanism may be initially set so that whenever the ball 36 moves into a recess conforming accurately to a predetermined depth specification, the pointer will move to a zero or other pre-selected mark on the indicator dial so as to indicate that the depth of the recess is without error. If, however, the recess is too deep, the pointer will move to a position to the right of the zero mark on the dial as illustrated in Fig. 1; and if the recess is too shallow the pointer will stop at a position to the left of the zero mark on the dial. Upon substitution of the collar-ball unit 30—36 for a unit having either a larger or smaller work piece contacting ball, the setting of the indicator dial need not be changed and the pointer will, as before, move to zero whenever the ball moves into a recess which is of the depth specified for the recess corresponding to the particular collar-ball unit employed. Preferably, the collar members will bear indicia as to the dimensions of the recesses to be measured by the gauge when mounting the respective collar-ball units.

Although only one form of the invention has been shown and described in detail, it will be apparent to those skilled in the art that the invention is not so limited but that various changes may be made therein without departing from the spirit of the invention or the scope of the appended claims.

I claim:

1. A depth gauge comprising a body member having a work piece engaging face portion, an indicator mechanism mounted upon said body member, a plunger slidably mounted within said body member in operative association with said indicator mechanism for actuation of the latter in response to sliding movement of said plunger within said body member, a work piece contact member normally disposed substantially within said body member in operative association with said plunger and adapted to move to extend beyond said work piece engaging face portion and into a recess in the work piece to be measured, said plunger and said work piece contact member being mutually magnetically attracted to normally maintain said contact member in engagement with said plunger.

2. In a gauge having a body provided with means for resting upon a plane surface of a work piece, a magnetic plunger guided by said body and provided with a plane face parallel to the plane of said means, a work piece contacting ball magnetically held engaged with said face of the plunger, and the body having substantially non-magnetic portions engageable with the ball for preventing the latter from rolling from said plane face of the plunger while allowing the ball limited rolling motion in any direction upon said plane face of the plunger.

3. In a gauge having a body carrying an indexing device, a magnetic member movable relative to said body to transmit motion from a work piece contact element to said indexing device, and a work piece engaging ball element held magnetically by said member and adapted to roll thereon in directions normal to the direction of motion transmitted through said member.

4. In a gauge having a body provided with a portion for engaging and resting upon a plane surface of a work piece, a movable member having a plane face, means mounting said member to the body for maintaining said face parallel to the plane of the work piece engaging means during movement of the member toward and away therefrom, a work piece engaging ball magnetically held engaged with said plane face of the movable member, and substantially non-magnetic means engageable with the ball and limiting the rolling motion of the ball in any direction upon said plane face of the movable member.

ARTHUR A. SCHWARTZ.